March 17, 1964 M. J. PURETIC 3,124,890
CONVEYOR APPARATUS FOR FISHING BOATS
Filed Nov. 21, 1961 2 Sheets-Sheet 2
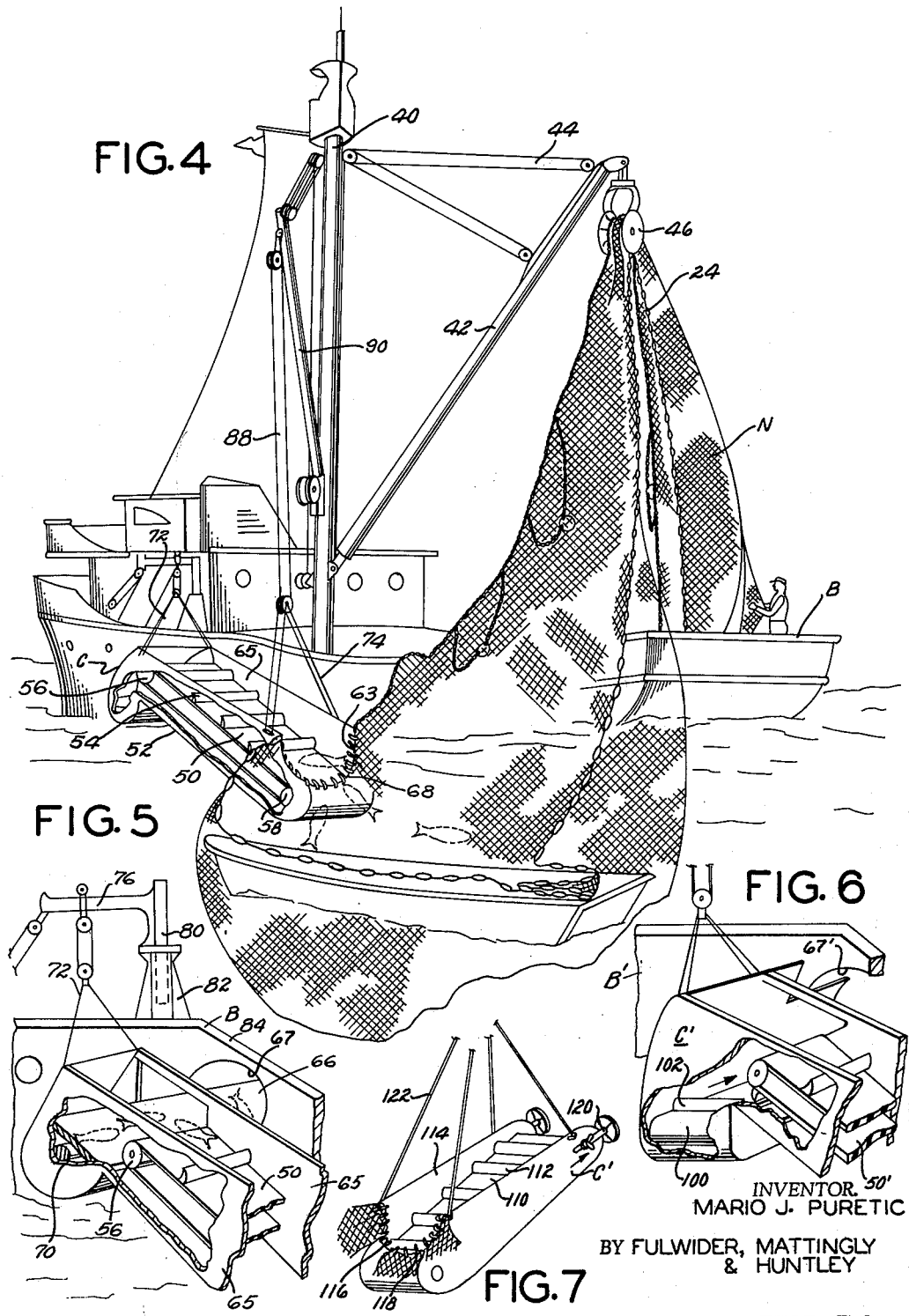
INVENTOR.
MARIO J. PURETIC
BY FULWIDER, MATTINGLY
& HUNTLEY
ATTORNEYS

United States Patent Office 3,124,890
Patented Mar. 17, 1964

3,124,890
CONVEYOR APPARATUS FOR FISHING BOATS
Mario J. Puretic, 30514 Avenida Corona,
San Pedro, Calif.
Filed Nov. 21, 1961, Ser. No. 153,957
4 Claims. (Cl. 43—6.5)

The present invention relates generally to the art of fishing and more particularly to a novel system for recovering fish from a net and transferring such fish onto a fishing boat.

Although fishing is one of the oldest arts, comparatively little has been done over the years to change apparatus and methods that have been utilized in the fishing art for centuries. A fundamental and novel advance in the art of fishing is disclosed in my United States Letters Patent Nos. 2,733,530 and 2,733,531, issued February 7, 1956. These patents relate to an apparatus and method for drawing a net alongside a fishing boat by means of a power-driven block suspended from a boom on the boat. The use of such power-driven block has greatly expedited the hauling-in of the net alongside the boat, and it has been possible in many cases to substantially reduce the number of men required for a commercial fishing boat crew. Although the use of such power-driven blocks permits the netted fish to be brought alongside the fishing boat in a minimum period of time, there still remains the difficult problem of recovering the fish from the net and transferring such fish into the hold of the fishing boat.

It is conventional to scoop the netted fish from the net by means of a shallow, basket-like device, generally termed a brailer. This brailer generally comprises a rigid hoop approximately five or six feet in diameter from which depends an open-topped bag-like net. The hoop is attached to a long handle. This handle is manipulated by two or three men positioned in a large skiff alongside the fishing boat. These men manually urge the hoop into the mass of heavy fish within the seine. Thereafter, the hoop is hoisted towards the fishing boat by means of a line attached hereto and extending to the fishing boat's deck. During this operation the skiff is usually pitching heavily in the sea. Thus, the brailing operation is a dangerous job requiring great experience and tremendous strength. Moreover, this operation is time consuming. Alternatively, the netted fish may be pumped into the fishing boat. This system, however, is only useable with smaller fish.

It is a major object of the present invention to provide a novel system utilizing conveyor belt means for rapidly and safely transferring netted fish onto a fishing boat.

In general, the novel system of the present invention includes conveyor belt means mounted on a fishing boat, with one end of the conveyor belt means being submerged. The fishing boat is also provided with net handling means whereby the net may be closed and then drawn alongside the boat whereafter the net is gradually hoisted so as to empty the fish entrapped within the net onto the conveyor belt means. The conveyor belt means then transfers such fish into the fish-receiving hold or holds of the fishing boat.

More particularly, the preferred net handling means utilized with the present invention includes a power-driven block of the type disclosed and claimed in my United States Patent No. 2,733,531 entitled Net Handling Apparatus, issued February 7, 1956. This power block is mounted in a raised position on the fishing boat. Preferably, the net will be of the purse seine type. When the net has been pursed the power block is employed to draw or winch-in the net alongside the fishing boat. Thereafter, the power block gathers the net into a pocket-like configuration, with such pocket being progressively tilted so as to gradually empty the fish therein into the lower portion of the conveyor belt.

It is a major object of the present invention to provide a system for transferring netted fish onto a fishing boat which is faster and more efficient than conventional fish brailing operations.

It is a further object of the present invention to provide a system of the aforedescribed nature which permits the fishing operations to be conducted with a minimum of personnel. Moreover, the physical labor required of such personnel is far less than with conventional fishing means.

These and other objects and advantages of the present invention will become apparent when taken in conjunction with the appended drawings wherein:

FIGURE 4 is a perspective view in enlarged scale showing a later step in the net gathering operation;

FIGURE 5 is a further enlarged fragmentary perspective view of the upper portion of a conveyor belt unit of said apparatus;

FIGURE 6 is a fragmentary perspective view showing an alternative form of conveyor belt unit; and FIGURE 7 is a fragmentary perspective view showing another form of conveyor belt unit embodying the present invention.

Figure 1:
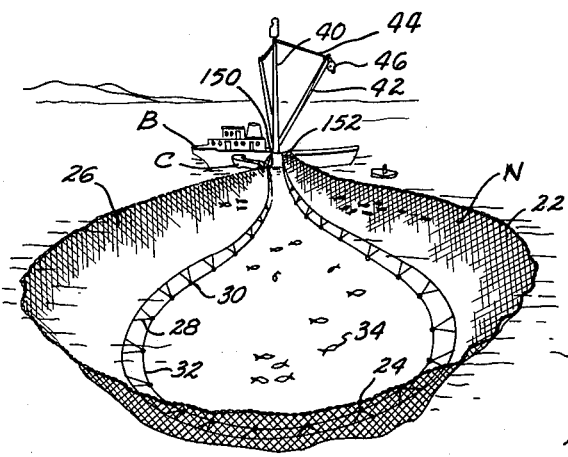
FIGURE 1 is a perspective view showing a fishing boat equipped with a preferred form of apparatus embodying the present invention, such fishing boat being provided with a seine net that has been set in a fish trapping position.

Referring to the drawings, it should be understood that apparatus constructed in accordance with the teachings of the present invention is adapted for use in retrieving a net and the lines connected therewith from the sea, with sections of said net and lines being thereafter sequentially disposed aboard a fishing boat in stacked arrangement.

In FIGURE 1 there is shown a fishing boat B equipped with a preferred form of apparatus embodying the present invention. This apparatus includes a power-driven conveyor belt unit C shown disposed alongsisde one side of a fishing boat B. The fishing boat B is provided with a net N. The net N is commonly termed a seine net and includes a float or cork line 22, which as its name implies has a number of corks, floats or other buoyant bodies 24 attached thereto at longitudinally spaced intervals. An elongated wall or panel of webbing 26 is supported from the cork line 22. The lower edge portions of the webbing panel 26 are fixed to a plurality of ring cables 28. Each of the ring cables 28 is attached to a pursing ring 30. The pursing rings 30 removably receive a weighty purse line 32. The purse line 32 is adapted to have its length reduced in a well known manner so as to "purse" the lower portion of the webbing panel together.

Figure 2:
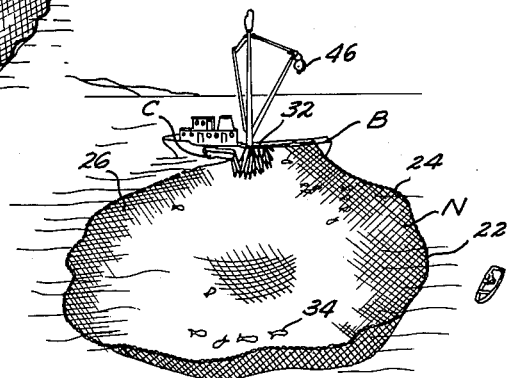
FIGURE 2 is a perspective view similar to FIGURE 1 but showing said net after it has been pursed.

In FIGURE 1 the net N and its associated parts are shown after the net has been set around a school of fish 34. At this time one vertical edge 150 of the net N is secured to the lower or fish receiving end of the conveyor belt unit C. The opposite vertical edge 152 of the net N is attached to the fishing boat B somewhat rearwardly of the lower end of the conveyor belt unit C. It will be apparent that the lower edge of the net N is at this time maintained submerged by the weight of the rings 30 and the purse line 32. In FIGURE 2 the net N has been completely pursed and the net is ready to be gathered towards the boat B.

The boat B is provided with a mast 40. A boom 42 has its lower end pivotally attached to the mast 40 with hoisting cables 44 being provided to control the elevation of the free end of the boom 42. The free end of the boom 42 supports a power-driven block 46. This power block 46 is of the type disclosed in my United States Letters Patent No. 2,733,531, issued February 7, 1956. This type of power block has become conventional equipment on many fishing boats and is used to rapidly retrieve a seine net and deposit it upon the deck of a fishing boat. The details of the power block 46 are not within the scope of the present invention and hence such details are not set forth herein.

Referring now to FIGURE 4, the conveyor belt unit C is adapted to be temporarily mounted at one side of the fishing boat F in an upwardly inclined position, with the lower end of this unit being submerged. The conveyor belt unit C includes an endless belt 50 which is mounted within a suitable enclosure or housing 52. The endless belt member 50 is preferably provided with transverse ribs 54 at longitudinally spaced portions of its outer side. The belt member 50 is supported between a horizontal upper roller 56 and a horizontal lower roller 58.

The enclosure 52 may be formed of a suitable material, such as metal, wood, synthetic plastic or a combination of these materials. The lower end of the enclosure 52 is formed with a fish-receiving mouth 63. The mouth 63 is disposed at the lower front end of an upwardly extending open-topped passage defined by a pair of upstanding walls 65 of the enclosure 52. The passage merges at its upper end into a fish-receiving hopper 66. The fish-receiving hopper 66 is inclined downwardly slightly whereby fish deposited therein by the conveyor belt 50 will slide onto the fishing boat B. To this end an opening 67 is formed in the side of the fishing boat adjacent the conveyor belt unit C. The opening 67 is in communication with a fish hold (not shown). It should be noted that the portion of the enclosure 52 adjacent the mouth 63 is provided with a plurality of net-engaging fingers 68. Preferably, these fingers 68 are slightly curved and extend toward the top of the enclosure passage.

The upper portion of the enclosure 52 below the hopper 66 may enclose a suitable power-operated means 70 as for example a hydraulic motor, for rotating the upper roller 56. This motor will be drivingly connected in a conventional manner (not shown) to the upper roller 56.

The enclosure 52 is adapted to be supported alongside the fishing boat B and generally parallel thereto by means of a front sling 72 and a rear sling 74. The front sling 72 is connected to a horizontal support arm 78. The horizontal support arm 78 is rigidly secured at one end to an upstanding post 80 that is pivotally carried within a pedestal 82 mounted adjacent the rail 84 of the fishing boat. The free end of the support arm 78 is adapted to be secured in its position of FIGURES 4 and 5 during a fish retrieving operation. The rear sling 74 is supported by conventional hoisting rigging 88 secured to a second boom 90 carried by the mast 40. With this arrangement, the conveyor belt unit C may be normally stowed on the rear deck of the fishing boat B. When the fish retrieving operation is to take place the slings 72 and 74 and their associated hoisting parts will be used to raise the conveyor belt unit C off the deck and lower it alongside the fishing boat into the position shown in FIGURES 1 through 5.

Referring now to FIGURE 6, there is shown an alternative form of conveyor belt unit C' embodying the present invention. The conveyor belt unit C' is substantially identical to the aforedescribed conveyor belt unit C. Accordingly, the like parts of conveyor belt unit C' bear primed reference numerals. The conveyor belt unit C' does not use a fish-receiving hopper 66. In place of this hopper the conveyor belt unit C' is provided with a second endless conveyor belt 100. The conveyor belt 100 is power-driven in a suitable conventional manner. Belt 100 is also preferably formed with a plurality of transverse ribs 102 at longitudinally spaced portions on its outer side. The conveyor belt 100 extends generally horizontally and is adapted to transfer fish dumped onto its upper surface from the upper end of the conveyor belt 50' through the opening 67' into the confines of the fishing boat B'.

Referring to FIGURE 7, there is shown yet another form of conveyor belt unit C" embodying the present invention. The conveyor belt unit C" includes an upwardly inclined power-driven conveyor belt 110 preferably provided with transverse ribs 112 at longitudinally spaced points on its outer side. The conveyor belt 110 is supported within a suitable enclosure 114. The lower end of the enclosure 114 defines a fish-receiving mouth 116. The enclosure is formed with a plurality of net-engaging fingers 118 along the periphery of the mouth 116. These fingers 118 are similar to the fingers 68 of the conveyor belt unit C shown particularly in FIGURE 4. The upper end of the enclosure 114 includes a pair of pads 120. These pads 120 are adapted to be removably inserted within a pair of complementary sockets (not shown) formed on the side of a fishing boat (not shown). The enclosure 114 is supported by a suitable sling 122. With this arrangement, the enclosure 114 is normally supported upon the deck of a fishing boat. When a net retrieving operation is to take place the sling 122 will be attached to suitable hoisting means so as to position the enclosure 116 alongside the fishing boat with the pads 120 being inserted within their respective sockets.

In the operation of the aforedescribed apparatus and referring first to FIGURE 1 the net N will first be set around a school of fish 34 in a conventional manner. During this step one vertical edge 150 of the net N remains secured to the lower or fish receiving end of the conveyor belt unit C. At the conclusion of the net setting operation the opposite vertical edge 152 of the net N is taken aboard the fishing boat B at a point spaced rearwardly of the lower end of the conveyor belt unit C. Referring now to FIGURE 2, the purse line 32 is then winched onto the fishing boat B in a conventional manner so as to purse the net N. This is the condition shown in FIGURE 2.

Figure 3:
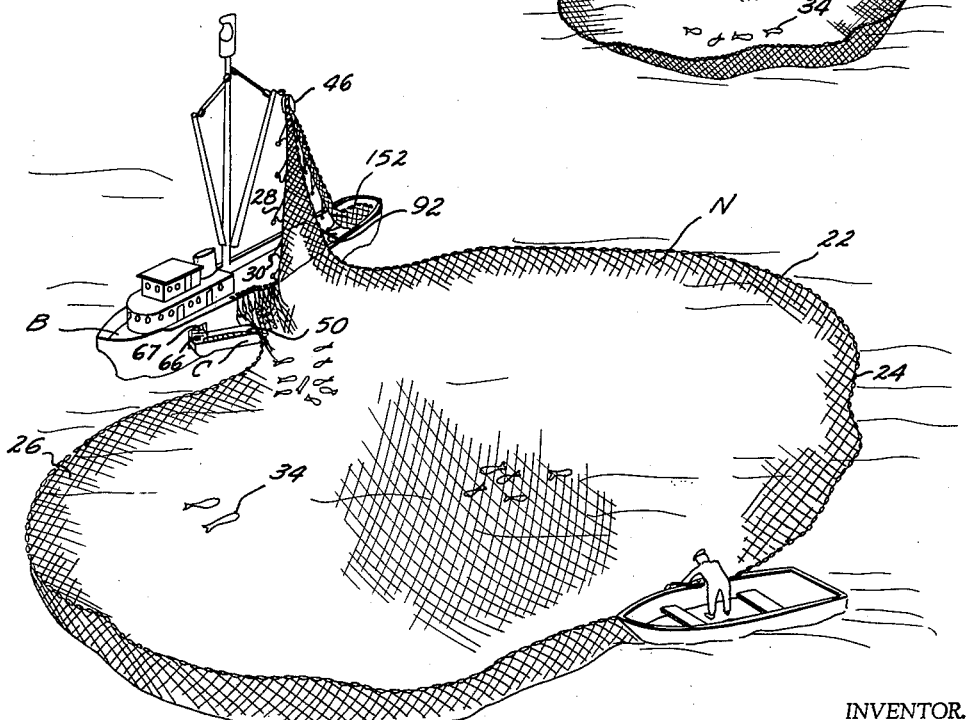
FIGURE 3 is a perspective view similar to FIGURES 1 and 2 but showing said net being hoisted onto said fishing boat.

Referring now to FIGURE 3, after the pursuing step the vertical edge 152 of the net N is extended through the power block 46 and then downwardly onto the rear deck 92. The purse line 32 is removed from the pursing rings 30 in a conventional manner whereby the power block 46 may progressively gather the net N towards the boat B, with the net being deposited upon the rear deck 92 after passing through the power block in the manner indicated in FIGURE 3. As the power block 46 continues to gather the net N towards the boat B, the fish contained within the net will be progressively directed to the lower end of the conveyor belt unit C. Referring to FIGURE 4, as the last submerged portion of the net N is raised and gathered towards the fishing boat B, the fish contained therein will be progressively dumped upon the lower end of the conveyor belt 50. This dumping process will continue until the net is raised substantially clear of the water. The fish dumped upon the lower end of the conveyor belt 50 will be transferred upwardly to be dumped into the hopper 66. From this point the fish will slide through the opening 67 and into the confines of the boat B.

It will be apparent that the operation of the conveyor belt unit of FIGURES 6 and 7 will be substantially the same as described hereinbefore. With the conveyor belt unit of FIGURE 6, however, the fish falling off the upper end of the conveyor belt 50' will be transferred onto the boat B' by the conveyor belt 100. With the conveyor belt unit of FIGURE 7, the fish may fall off the upper end of the conveyor belt 110 directly onto the deck of the fishing boat upon which unit C" is positioned, or alternatively, onto a chute (not shown) or secondary conveyor means (not shown).

Various changes and modifications may be made with respect to the foregoing detailed description without departing from the spirit of the invention or the scope of the following claims.

I claim:
1. Apparatus for transferring fish from a net to a fishing boat, comprising:
   an enclosure that is normally arranged in a stowed position on said boat until the commencement of a fish transferring operation;
   means on said boat for moving said enclosure from said stowed position to an upwardly inclined operative position alongside said boat wherein the lower portion of said enclosure is submerged;
   conveyor means supported within said enclosure;
   power-operated means on said enclosure to drive said conveyor means;
   net-holding elements on the lower portion of said enclosure adapted to hold one portion of said net;
   and power-operated net retrieving means on said boat that progressively raise and gather the remaining portion of said net towards the lower portion of said enclosure whereby fish trapped in said net are dumped out of said net and onto the lower end of said conveyor means, with said conveyor means lifting said fish for transfer onto said boat.

2. Apparatus for transferring fish from a net to a fishing boat, comprising:
   an enclosure that is normally arranged in a stowed position on said boat until the commencement of a fish transferring operation;
   means on said boat for moving said enclosure from said stowed position to an upwardly inclined operative position alongside said boat wherein the lower portion of said enclosure is submerged;
   a conveyor belt formed with transverse ribs supported within said enclosure;
   power-operated means on said enclosure to drive said belt;
   net-holding elements on the lower portion of said enclosure adapted to hold one portion of said net;
   and power-operated net retrieving means on said boat that progressively raise and gather the remaining portion of said net towards the lower portion of said enclosure whereby fish trapped in said net are dumped out of said net and onto the lower end of said belt, with said belt lifting said fish for transfer onto said boat.

3. Apparatus for transferring fish from a net to a fishing boat, comprising:
   an enclosure that is normally arranged in a stowed position on said boat until the commencement of a fish transferring operation;
   means on said boat for moving said enclosure from said stowed position to an upwardly inclined operative position alongside said boat wherein the lower portion of said enclosure is submerged;
   conveyor means supported within said enclosure;
   power-operated means on said enclosure to drive said conveyor means;
   net holding elements on the lower portion of said enclosure adapted to hold one portion of said net;
   power-operated net retrieving means on said boat that progressively raise and gather the remaining portion of said net towards the lower portion of said enclosure whereby fish trapped in said net are dumped out of said net and onto the lower end of said conveyor means, with said conveyor means lifting said fish for transfer onto said boat;
   and a downwardly inclined fish hopper disposed within the upper portion of said enclosure to receive said fish from the upper end of said conveyor means to transfer said fish onto said boat.

4. Apparatus for transferring fish from a net to a fishing boat, comprising:
   an enclosure that is normally arranged in a stowed position on said boat until the commencement of a fish transferring operation;
   means on said boat for moving said enclosure from said stowed position to an upwardly inclined operative position alongside said boat wherein the lower portion of said enclosure is submerged;
   a conveyor belt formed with transverse ribs supported within said enclosure;
   power-operated means on said enclosure to drive said belt;
   net holding elements on the lower portion of said enclosure adapted to hold one portion of said net;
   power-operated net retrieving means on said boat that progressively raise and gather the remaining portion of said net towards the lower portion of said enclosure whereby fish trapped in said net are dumped out of said net and onto the lower end of said belt, with said belt lifting said fish for transfer onto said boat;
   and a second power-driven conveyor belt disposed within the upper portion of said enclosure to receive said fish from the upper end of said conveyor means to transfer said fish onto said boat.

References Cited in the file of this patent
UNITED STATES PATENTS
2,347,412     Higgins  ---------------- Apr. 25, 1944

OTHER REFERENCES
"The Case for the Stern Ramp," published October 1961 in "World Fishing," pages 28, 29 and 35.